United States Patent
Basso et al.

(10) Patent No.: US 12,129,202 B2
(45) Date of Patent: Oct. 29, 2024

(54) SPILL CONTAINMENT AND MANAGEMENT SYSTEM FOR GLASS CERAMIC COOKTOP

(71) Applicant: Whirlpool Corporation, Benton Harbor, MI (US)

(72) Inventors: Margherita Basso, Scorzè (IT); Cesare Cristiano Guidi, Arona (IT); Christine Nortey, Milan (IT)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 838 days.

(21) Appl. No.: 17/138,368

(22) Filed: Dec. 30, 2020

(65) Prior Publication Data

US 2022/0204396 A1    Jun. 30, 2022

(51) Int. Cl.
| | | |
|---|---|---|
| *C03C 17/25* | (2006.01) | |
| *B08B 17/02* | (2006.01) | |
| *B08B 17/06* | (2006.01) | |
| *F24C 15/14* | (2006.01) | |
| *H05B 3/74* | (2006.01) | |

(52) U.S. Cl.
CPC ............ *C03C 17/25* (2013.01); *B08B 17/025* (2013.01); *B08B 17/06* (2013.01); *F24C 15/14* (2013.01); *H05B 3/74* (2013.01); *C03C 2217/22* (2013.01); *C03C 2217/23* (2013.01); *C03C 2217/70* (2013.01); *C03C 2218/11* (2013.01)

(58) Field of Classification Search
CPC ....... C03C 17/25; B08B 17/025; B08B 17/06; F24C 5/14; H05B 3/74
USPC .......................................... 454/184; 126/1 R
See application file for complete search history.

(56) References Cited

U.S. PATENT DOCUMENTS

| | | | |
|---|---|---|---|
| 3,354,022 A | 11/1967 | Dettre et al. | |
| 5,815,995 A | 10/1998 | Adam | |
| 6,531,206 B2 | 3/2003 | Johnston et al. | |
| 6,623,863 B2 | 9/2003 | Kamitani et al. | |
| 6,647,550 B1 | 11/2003 | Matsuzaki et al. | |
| 6,746,567 B2 | 6/2004 | Johnston et al. | |
| 8,286,561 B2 | 10/2012 | Driver et al. | |
| 8,596,205 B2 | 12/2013 | Driver et al. | |
| 8,709,616 B2 | 4/2014 | Shigeru et al. | |
| 9,074,778 B2 * | 7/2015 | Nall | ........................ F24C 15/10 |
| 9,179,773 B2 | 11/2015 | Driver et al. | |
| 9,207,012 B2 | 12/2015 | Driver et al. | |
| 9,243,175 B2 | 1/2016 | Sikka et al. | |
| 10,130,176 B2 | 11/2018 | Driver et al. | |
| 10,317,129 B2 | 6/2019 | Curdt et al. | |
| 2004/0148892 A1 | 8/2004 | Kitakado | |

(Continued)

FOREIGN PATENT DOCUMENTS

| | | |
|---|---|---|
| EP | 0476510 A1 | 3/1992 |
| EP | 3273751 A1 | 1/2018 |

(Continued)

OTHER PUBLICATIONS

European Search Report for EP21205424.1-1108, dated Apr. 21, 2022 (69 Pages).

*Primary Examiner* — Vivek K Shirsat
(74) *Attorney, Agent, or Firm* — Harness, Dickey & Pierce, PLC (57) ABSTRACT

A panel is disclosed. The panel has an exposed surface and a plurality of liquid-repelling elements disposed directly on the exposed surface in a discontinuous pattern. The liquid-repelling elements include a non-hydrophobic material.

17 Claims, 5 Drawing Sheets

(56) References Cited

U.S. PATENT DOCUMENTS

| | | |
|---|---|---|
| 2012/0052241 A1 | 3/2012 | King et al. |
| 2015/0097475 A1 | 4/2015 | Sikka et al. |
| 2020/0248908 A1* | 8/2020 | Brudieu ................. F24C 15/14 |

FOREIGN PATENT DOCUMENTS

| | | |
|---|---|---|
| ES | 2702791 A1 | 3/2019 |
| JP | 2004251095 A | 9/2004 |
| JP | 2009052826 A | 3/2009 |
| WO | WO-2002097216 A1 | 12/2002 |
| WO | WO-2008093715 A1 | 8/2008 |
| WO | 2011056742 A1 | 5/2011 |

* cited by examiner

SPILL CONTAINMENT AND MANAGEMENT SYSTEM FOR GLASS CERAMIC COOKTOP

BACKGROUND

This section provides background information related to the present disclosure which is not necessarily prior art.

Freestanding cooking appliances are typically installed in close proximity to kitchen worktops, e.g., counters and furniture, which often are made of materials, such as wood, stone, quartz, and marble, that are sensitive to heat and/or humidity and easily stainable. When liquids spill out of cookware or other utensils onto cooktops, the cooktops are unable to retain them such that contact between the liquids and surrounding counters or furniture can be avoided. As a consequence, liquids often flow onto and contact counters and furniture, which absorb the liquids and may become permanently stained and/or otherwise damaged. These issues are also present in cooking appliances that are "built-in" or installed flush with a surrounding worktop, countertop, or island surface. Therefore, it would be beneficial for cooking appliances to be capable of trapping or slowing spills so that they can be cleaned before surrounding worktops or furniture are damaged.

SUMMARY

This section provides a general summary of the disclosure, and is not a comprehensive disclosure of its full scope or all of its features.

The present disclosure relates to a spill containment and management system for glass ceramic cooktops.

In various aspects, the current technology provides a panel including an exposed surface and a plurality of liquid-repelling elements disposed directly on the exposed surface in a discontinuous pattern, wherein the liquid-repelling elements include a non-hydrophobic material.

In one aspect, the panel includes a glass ceramic material.

In one aspect, the plurality of liquid-repelling elements has a different surface energy than the exposed surface.

In one aspect, the plurality of liquid-repelling elements is visibly transparent.

In one aspect, the plurality of liquid-repelling elements exhibits a first water contact angle that is greater than a second water contact angle exhibited by the exposed surface, wherein the first water contact angle is less than or equal to about 90°.

In one aspect, the plurality of liquid-repelling elements exhibits a water contact angle greater than or equal to about 30° to less than or equal to about 70°.

In one aspect, the non-hydrophobic material is a film including zirconium dioxide ($ZrO_2$) and silicon dioxide ($SiO_2$), the silicon dioxide ($SiO_2$) having a concentration of less than or equal to about 50 wt. % based on the total weight of the zirconium dioxide ($ZrO_2$) and the silicon dioxide ($SiO_2$).

In one aspect, the film includes greater than 0 wt. % to less than or equal to about 50 wt. % silicon dioxide ($SiO_2$) and further includes phosphorus (P), the phosphorus (P) being dispersed either substantially uniformly throughout the film or in a concentration gradient that decreases from a top surface of the film to an opposing bottom surface of the film that is in direct contact with the exposed surface of the panel.

In one aspect, the film is substantially free of silicon dioxide ($SiO_2$) and further includes phosphorus (P), the phosphorus (P) being dispersed either substantially uniformly throughout the film or in a concentration gradient that decreases from a top surface of the film to an opposing bottom surface of the film that is in direct contact with the exposed surface of the panel.

In one aspect, the plurality of liquid-repelling elements is configured to guide aqueous liquids to a predetermined location.

In one aspect, the discontinuous pattern includes discontinuous lines that extend about at least one edge of the panel, a plurality of segmented lines arranged in geometric patterns about at least one edge of the panel, at least one line defining a maze-type pattern that extends about at least one edge of the panel, a plurality of geometric elements disposed about a central region of the panel, a maze-type pattern disposed about a central region of the panel, or a combination thereof.

In one aspect, the panel defines a cooktop surface.

In one aspect, the plurality of liquid-repelling elements is substantially free of hydrophobic components.

In various aspects, the current technology also provides a panel including a substrate having a glass ceramic material and a top surface and a plurality of liquid-repelling films disposed directly on the top surface in a discontinuous pattern that does not define a complete enclosure, wherein the plurality of liquid-repelling films includes zirconium (Zr), oxygen (O), and at least one of silicon (Si) or phosphorus (P), is non-hydrophobic, exhibits a water contact angle of less than or equal to about 90°, and directs aqueous liquids to at least one predetermined location.

In one aspect, the panel further includes at least one heating element region.

In one aspect, the panel further includes at least one reservoir configured to receive and hold an aqueous liquid directed to the reservoir by the liquid-repelling films.

In various aspects, the current technology provides a cooking appliance including the panel as a cooktop.

In one aspect, the cooking appliance is a gas cooktop, an electric cooktop, or an induction cooktop.

In various aspects, the current technology further provides a method of preparing a panel, the method including disposing a precursor solution in a discontinuous pattern directly onto a surface of a blank glass ceramic panel, the precursor solution including zirconium (Zr), oxygen (O), and optionally silicon (Si); heating the blank glass ceramic panel and the precursor solution; and creating liquid-repelling films on the surface having the discontinuous pattern from the precursor solution and forming the panel, wherein the liquid-repelling films are non-hydrophobic, exhibit a water contact angle of less than or equal to about 90°, and direct aqueous liquids to at least one predetermined location on the panel.

In one aspect, the method also includes incorporating the panel into a cooking appliance.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

When liquids, including hot liquids, are spilled onto surfaces of cooktops, the liquids may contact, stain, or otherwise damage adjacent worktops or furniture. Accordingly, the current technology provides cooktops having liquid-directing and/or liquid-containing elements that slow, minimize, or prevent the spilled liquids from flowing off of cooktops. As a result, a user is capable of cleaning liquid spills before the adjacent worktops or furniture are stained or damaged.

Figure 1:
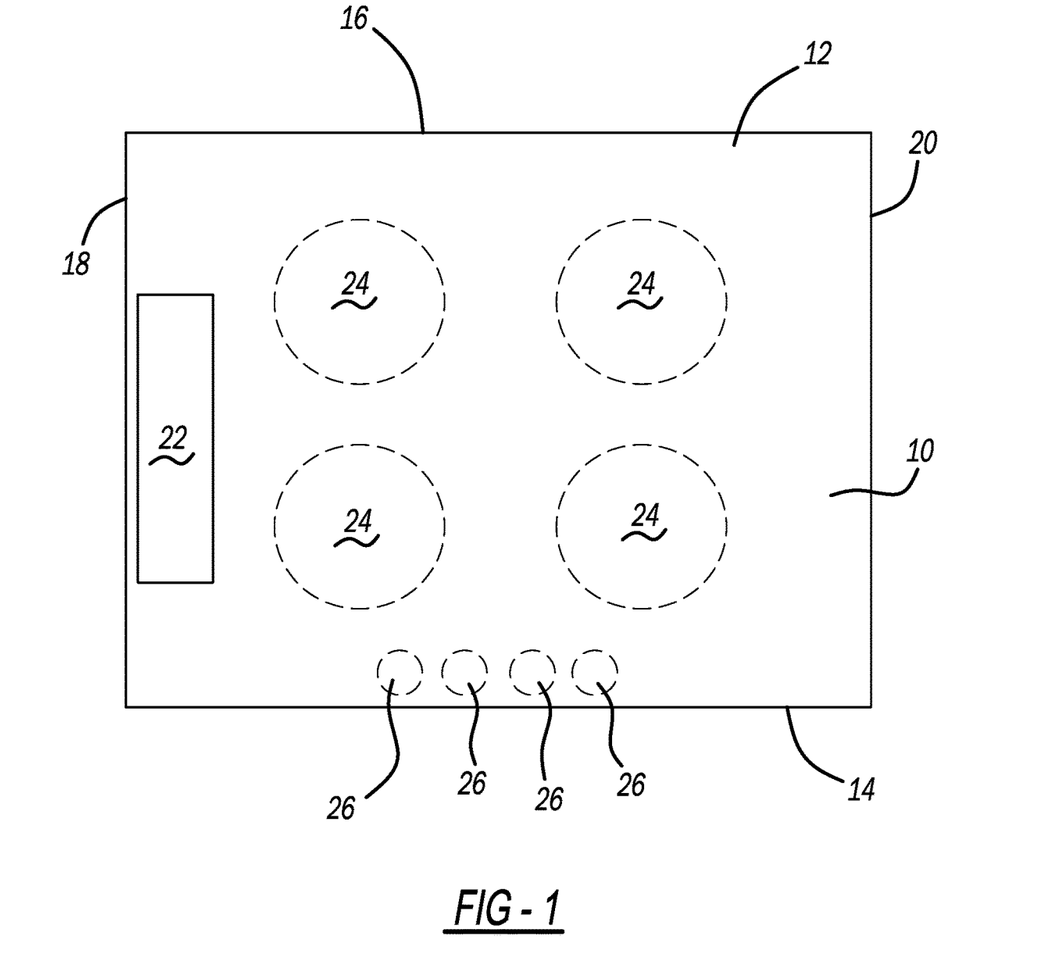
FIG. 1 is an illustration of a panel in accordance with various aspects of the current technology.

With reference to FIG. 1, the current technology provides a panel 10 having a top surface 12, a front edge 14, a rear edge 16, a left edge 18, and a right edge 20. At least one liquid-repelling element 22 is disposed on the top surface 12. The panel 10 can be incorporated into an appliance that benefits from slowing, minimizing, or preventing liquid spills from flowing off of the panel 10. In certain aspects, the appliance is a cooking appliance, such as a range, a rangetop, or a stovetop, each of which can be freestanding or built into surrounding architecture, or an interior surface of an oven or a microwave. More particularly, the panel 10 is incorporated into the cooking appliance as a cooktop so that at least portions of the top surface 12 of the panel 10 are exposed to an external environment. As a component of a cooking appliance, the panel 10 can include at least one heating element region 24 (although four heating element regions 24 are shown in FIG. 1). The at least one heating element region 24 can accommodate or house, for example, an electric burner or a gas burner or be a surface above an electromagnet and coil for induction heating. In some aspects, the panel 10 can also include at least one control element 26 (although four control elements 26 are shown in FIG. 1), such as a knob and/or a button, for controlling the amount of heat provided from the at least one heating element region 24. However, the at least one control element 26 can alternatively be located on a side edge of the panel 10 or on a different surface of the cooking appliance. It is understood that the positional configurations of the at least one heating element region 24 and the at least one control element 26 are independently exemplary and non-limiting and alternative positional configurations can be employed. Although the panel 10 is shown in a rectangular shape, it is understood that the shape is non-limiting.

The panel 10 is defined by a substrate comprising a glass ceramic material. As such, the panel 10 is also referred to herein as a "glass ceramic panel." As is known in the art, glass ceramic materials have an amorphous (glassy) phase and at least one crystalline (ceramic) phase embedded within the amorphous phase. Glass ceramic materials can be fabricated by, for example, subjecting a glass material to a heat treatment that controls glass nucleation and crystallization. Therefore, relative amounts of amorphous and crystalline phases can be controlled at least partially through the heat treatment. As the amount of crystalline phases increases, grain boundaries also increase, and the glass ceramic material transitions from being visibly transparent to opaque. The high strength, high impact resistance, low co-efficient of thermal expansion, and aesthetic optical properties of glass ceramic materials make them particularly suited for cooktops.

The glass ceramic material can be an oxide material or a non-oxide material. Whereas oxide materials include at least one oxide, such as silicon dioxide ($SiO_2$; "silicate"), boron trioxide ($B_2O_3$; "borate"), phosphorus pentoxide ($P_2O_5$; "phosphate"), or germanium dioxide ($GeO_2$; "germinate"), non-oxide materials include a chalcogenide (group 16 element), such as sulfur (S), selenium (Se), tellurium (Te), polonium (Po), or combinations thereof, for example, as sulfides, selenides, tellurides, and/or polonides, and optionally at least one of a halide or metal. Non-limiting examples of oxide glass ceramics include $Li_2O$—$Al_2O_3$—$SiO_2$ (LAS), which is a mixture of lithium, aluminum, and silicon oxides with glass forming agents, such as sodium oxide ($Na_2O$), potassium oxide ($K_2O$), or calcium oxide (CaO); MgO—$Al_2O_3$—$SiO_2$ (MAS), which is a mixture of magnesium, aluminum, and silicon oxides with glass forming agents; ZnO—$Al_2O_3$—$SiO_2$ (ZAS), which is a mixture of zinc, aluminum, and silicon oxides with glass forming agents; derivatives thereof; and combinations thereof. It is understood that "derivatives" of the above-listed oxide glass ceramics retain the same general composition, but include additional or alternative components or microstructures resulting from various thermal treatments. The glass ceramic material is non-hydrophobic, i.e., it exhibits a water contact angle of less than or equal to about 90°, less than or equal to about 80°, less than or equal to about 70°, or less than or equal to about 60°, including water contact angles of greater than or equal to about 10° to less than or equal to about 90°, e.g., about 10°, about 20°, about 30°, about 40°, about 50°, about 60°, about 70°, about 80°, or about 90°.

The at least one liquid-repelling element 22 comprises a film or a plurality of films disposed on the top surface 12 of the panel 10 in a discontinuous pattern. The film comprises a film material that is non-hydrophobic and exhibits a water contact angle of less than or equal to about 90°, less than or equal to about 80°, or less than or equal to about 70°. In certain aspects, the film material exhibits a water contact angle of greater than or equal to about 20° to less than or equal to about 90°, greater than or equal to about 30° to less than or equal to about 90°, greater than or equal to about 40° to less than or equal to about 90°, greater than or equal to about 50° to less than or equal to about 90°, greater than or equal to about 20° to less than or equal to about 80°, greater than or equal to about 30° to less than or equal to about 80°, greater than or equal to about 40° to less than or equal to about 80°, greater than or equal to about 50° to less than or equal to about 80°, greater than or equal to about 20° to less than or equal to about 70°, greater than or equal to about 30° to less than or equal to about 70°, greater than or equal to about 40° to less than or equal to about 70°, or greater than or equal to about 50° to less than or equal to about 70°. In certain aspects, the film material exhibits a water contact angle that is less than or equal to about 90°, but which is greater than the water contact angle exhibited by the glass ceramic material. As such, the at least one liquid-repelling element 22 has a different surface energy than exposed top surfaces 12 of the panel 10 that are not covered by the at least one liquid-repelling element 22.

The film material comprises zirconium (Zr), oxygen (O), and at least one of silicon (Si) or phosphorus (P). During its formation, the zirconium (Zr) reacts with the oxygen (O) to form a network of zirconium dioxide ($ZrO_2$). The zirconium dioxide ($ZrO_2$) exhibits water repellency as it does not carry hydrophilic hydroxyl (—OH) groups at the surface. However, when silicon (Si) is present, it also reacts with the oxygen (O) and forms silicon dioxide ($SiO_2$) within the network of zirconium dioxide ($ZrO_2$). This silicon dioxide ($SiO_2$) is capable of carrying hydrophilic hydroxyl (—OH) groups and provides the film material with a hydrophilic phase. By adjusting the amount of silicon dioxide ($SiO_2$) that is formed, the film material's capability of repelling or attracting water can be modulated. In some aspects, the film material comprises zirconium dioxide ($ZrO_2$) and silicon dioxide ($SiO_2$), with the silicon dioxide ($SiO_2$) having a concentration of less than or equal to about 50 wt. % or greater than or equal to 0 wt. % to less than or equal to about 50 wt. % based on the total weight of the zirconium dioxide ($ZrO_2$) and the silicon dioxide ($SiO_2$) in the film material. When present, the phosphorous (P) crosslinks with oxygen (O) atoms and provides anti-staining properties to the film material. The phosphorous (P) can be included in a distinct upper layer, in a concentration gradient that decreases downward from a top surface of the film to an opposing bottom surface of the film that is in direct contact with the top surface 12 of the panel 10, or dispersed substantially uniformly throughout the film. The phosphorous (P), when present, has a concentration of greater than or equal to about 0.001 wt. % to less than or equal to about 10 wt. % based on the total weight of the film. Examples of film material are described in U.S. Pat. No. 8,709,616, which is incorporated herein by reference in its entirety.

In certain aspects, each film is a single monolayer of the film material comprising, consisting essentially of, or consisting of zirconium (Zr), oxygen (O), and optionally silicon (Si) and/or phosphorous (P), without distinct sublayers. However, the film can include the phosphorus (P) as a decreasing concentration gradient from a top surface of the film to a bottom surface of the film that is in direct contact with the top surface 12 of the panel 10. In other aspects, the film is a single bilayer of the film material having a bottom layer comprising, consisting essentially of, or consisting of zirconium (Zr), oxygen (O), and optionally silicon (Si) and having a top layer comprising, consisting essentially of, or consisting of phosphorous (P). The film or plurality of films can be disposed directly on the top surface 12 of the panel 10 without any intervening or intermediate layers disposed between the film or plurality of films and the top surface 12 of the panel 10. Accordingly, the at least one liquid-repelling element 22 comprises, consists essentially of, or consists of the film material. As used herein, the term "consisting essentially of" or "consists essentially of" means that no other material is intentionally included in the respective layer or material, but that unavoidable impurities may be present at a concentration of less than or equal to about 5 wt. % based on the total weight of the respective layer or material. Each film has a thickness of greater than or equal to about 0.005 μm to less than or equal to about 100 μm, greater than or equal to about 0.005 μm to less than or equal to about 75 μm, greater than or equal to about 0.005 μm to less than or equal to about 50 μm, greater than or equal to about 0.005 μm to less than or equal to about 25 μm, greater than or equal to about 0.005 μm to less than or equal to about 10 μm, greater than or equal to about 0.01 μm to less than or equal to about 100 μm, greater than or equal to about 0.05 μm to less than or equal to about 100 μm, greater than or equal to about 0.1 μm to less than or equal to about 100 μm, or greater than or equal to about 1 μm to less than or equal to about 100 μm. Additionally, each film is visibly transparent so that the at least one liquid-repelling element 22 is invisible or substantially not visible to a human viewer. However, it is understood that each film can be dyed to a desired color.

The film material is substantially free of hydrophobic components. By "substantially free," it is meant that the film material does not intentionally include hydrophobic components, but may include less than or equal to about 5 wt. % of hydrophobic materials based on the total weight of the film as unavoidable impurities.

The at least one liquid-repelling element 22 is disposed directly on the top surface 12 of the panel 10 in a discontinuous pattern. By "discontinuous pattern," it is meant that the at least one liquid-repelling element 22 does not form a complete enclosure, such as a circle, oval, or polygon. Rather, the discontinuous pattern defines at least one line or solid shape that is configured to direct a liquid to a predetermined location. The discontinuous pattern comprises discontinuous lines that extend about at least one edge of the panel 10 (see FIGS. 2A-2D), a plurality of segmented lines arranged in geometric patterns about at least one edge of the panel 10 (see FIGS. 3A-3B), at least one line defining a maze-type (i.e., a labyrinth) pattern that extends about at least one edge of the panel 10 (see FIG. 3C), a plurality of geometric elements disposed about a central region of the panel 10 (see FIGS. 4A-4D), a maze-type pattern disposed about a central region of the panel 10 (see FIG. 4E), or a combination thereof.

Figure 2A:
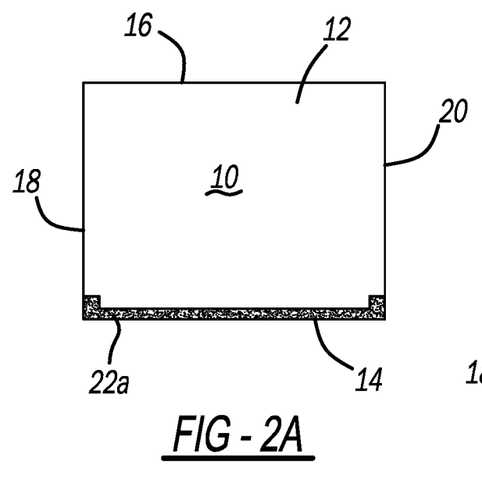
FIGS. 2A-2D are illustrations of a panel having liquid-repelling elements provided as discontinuous lines in accordance with various aspects of the current technology.
Figure 2B:
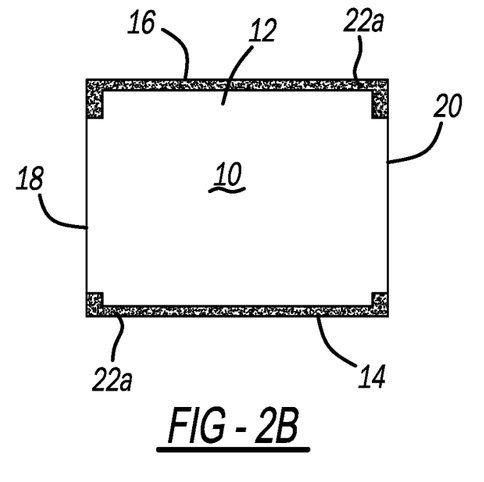
Figure 2C:
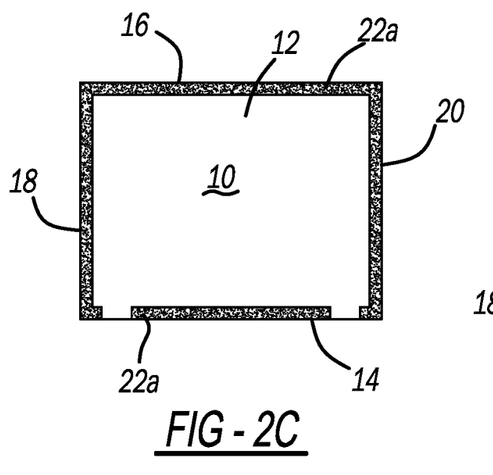
Figure 2D:
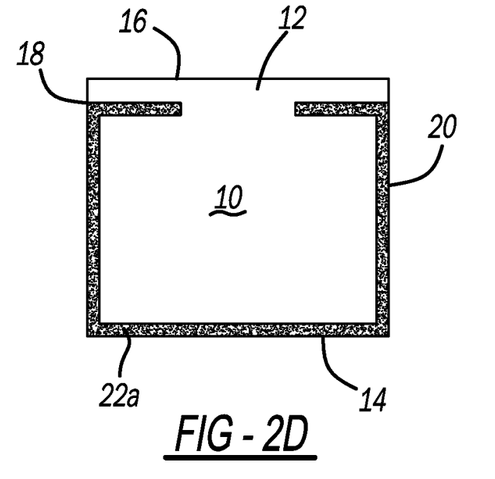

As shown in FIGS. 2A-2D, which depict the panel 10 of FIG. 1 with the at least one heating element region 24 and the at least one control element 26 excluded for clarity, the at least one liquid-repelling element 22 can be in the form of a single line 22a that extends (substantially two-dimensionally) about at least one edge of the panel 10, such as the front edge 14 (see FIG. 2A); a first single line 22a that extends about at least a first edge, such as the front edge 14, and a second single line 22a that extends about a second edge, such as the rear edge 16 (see FIG. 2B); a first single line 22a that extends about at least three edges, such as the left edge 18, the rear edge 16, and the right edge 20, and a second single line 22a that extends about a portion of a fourth edge, such as the front edge 14 (see FIG. 2C); or a single line 22a that extends about three edges, such as the left edge 18, the front edge 14, and the right edge 20, and that further extends about or near a portion of a fourth edge, such as the rear edge 16 (see FIG. 2D). Therefore, the single lines 22a are individual and independent, i.e., having distinct end points, and can extend about a portion of an edge, about an entire edge, or about an entire edge and about a portion of at least one adjacent edge. As shown in FIG. 2D, the single lines 22a can be located away from an edge, i.e., not immediate at an edge. Accordingly, the single lines 22a of FIGS. 2A-2D can extend substantially about the periphery of the panel 10, such as within about 20 cm, about 15 cm, or about 10 cm of the edges 14, 16, 18, 20, and are not disposed in a central region of the panel 10.

Figure 3A:
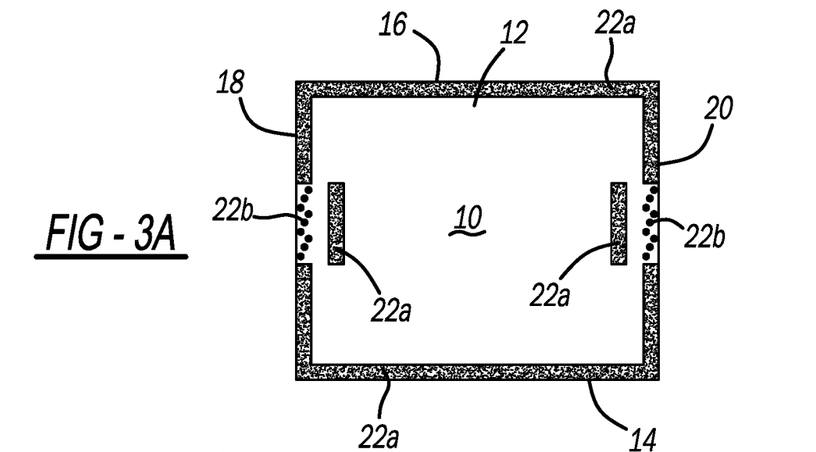
FIGS. 3A-3C are illustrations of a panel having liquid-repelling elements provided as segmented lines (FIGS. 3A and 3B) or as at least one line defining a maze-type pattern extending about at least one edge (FIG. 3C) in accordance with various aspects of the current technology.
Figure 3B:
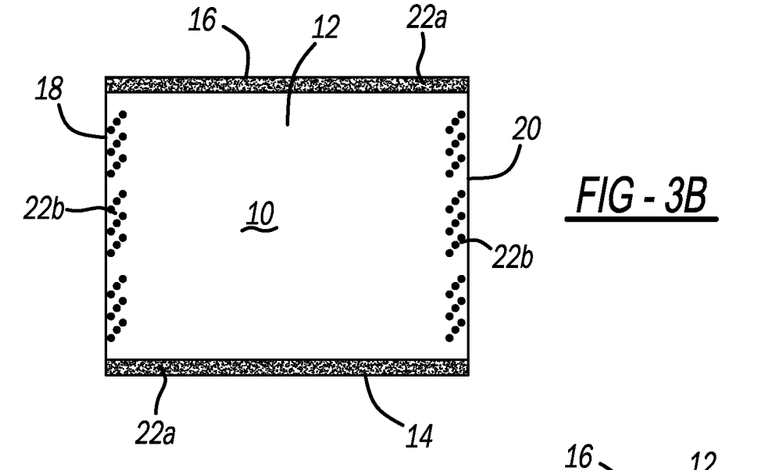
Figure 3C:
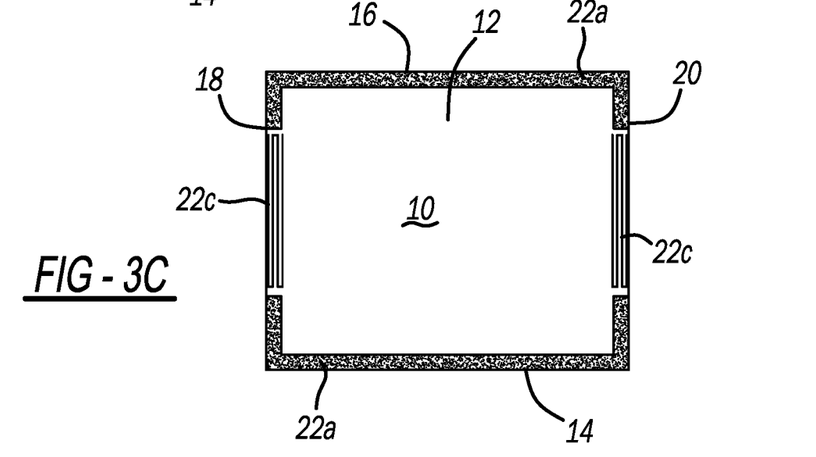

As shown in FIGS. 3A and 3B, which depict the panel 10 of FIG. 1 with the at least one heating element region 24 and the at least one control element 26 excluded for clarity, the at least one liquid-repelling element 22 can be in the form of at least one segment line 22b or a plurality of segmented lines 22b that may extend from an edge of the panel 10 toward a central region of the panel 10 at an angle relative to the edge. The segmented lines 22b provide a surface texture and can be defined by, as non-limiting examples, dots, dashes, regular shapes (e.g., triangles, squares, rectangles, circles, and the like), irregular shapes, or combinations thereof, wherein each dot, dash, regular shape, or irregular shape has a diameter of greater than or equal to about 1 mm to less than or equal to about 20 mm, greater than or equal to about 1 mm to less than or equal to about 15 mm, or greater than or equal to about 1 mm to less than or equal to about 10 mm. As non-limiting examples, the segmented lines 22b can extend about a portion of at least one edge of the panel 10, such as about a portion of the left and right edges 18, 20 (see FIG. 3A), or about at least one whole edge of the panel 10, such as about the whole left and right edges 18, 20 (see FIG. 3B). The at least one liquid-repelling element 22 can also be in the form of at least one line defining a maze-type pattern 22c extending about at least one edge of the panel 10, such as about the left and right edges 18, 20 (see FIG. 3C). As shown in FIGS. 3A-3C, the single lines 22a can be used together with the segmented lines 22b and the lines defining a maze-type pattern 22c.

Figure 4A:
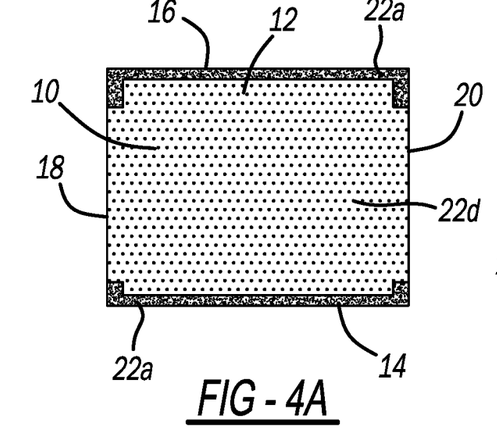
FIGS. 4A-4E are illustrations of a panel having liquid-repelling elements provided as a plurality of geometric elements (FIGS. 4A-4D) or as a maze-type pattern (FIG. 4E) in accordance with various aspects of the current technology.
Figure 4B:
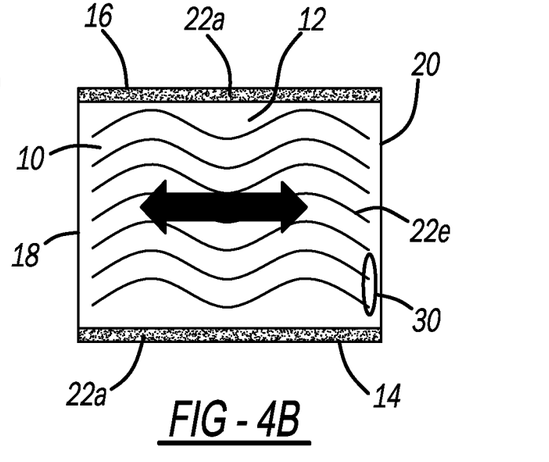
Figure 4C:
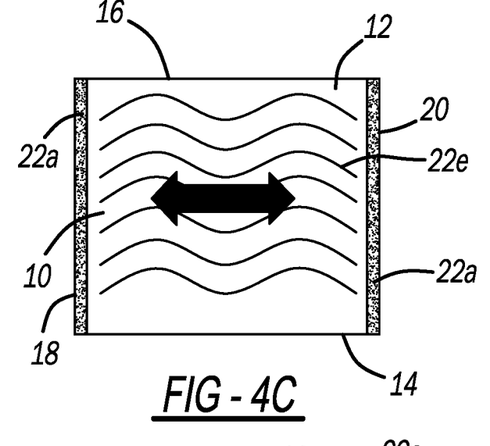
Figure 4D:
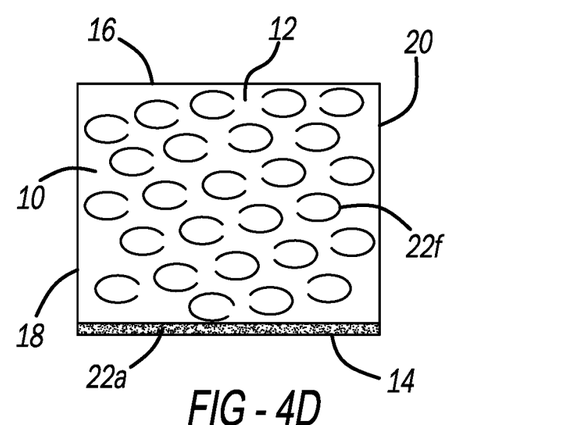
Figure 4E:
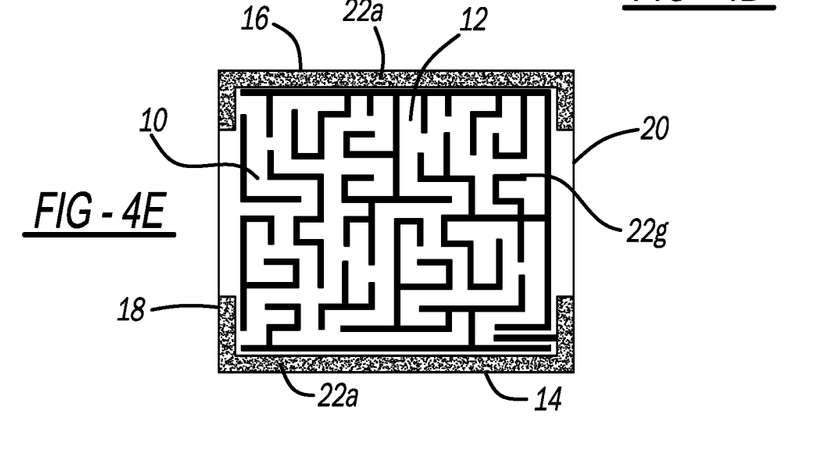

As shown in FIGS. 4A-4D, which depict the panel 10 of FIG. 1 with the at least one heating element region 24 and the at least one control element 26 excluded for clarity, the at least one liquid-repelling element 22 can be in the form of a plurality of geometric elements disposed about a central region of the panel 10 or a maze-type pattern disposed about a central region of the panel 10. The plurality of geometric elements can be, for example, a plurality of spots, dots, or polygons 22d as shown in FIG. 4A; a plurality of bent or wavy lines 22e as shown in FIGS. 4B and 4C; or a plurality of open-shaped elements 22f that each provide an opening that leads to internal containment area or region, such as a plurality of C-shaped elements, as shown in FIG. 4D. Alternatively, the at least one liquid-repelling element 22 can be in the form of a maze-type pattern 22g comprising a plurality of interconnecting lines that do not define a complete enclosure, as shown in FIG. 4E. As shown in FIGS. 4A-4E, the single lines 22a can be used together with the plurality of spots, dots, or polygons 22d, the plurality of bent or wavy lines 22e, the plurality of open-shaped elements 22f, and/or the maze-type pattern 22g.

The at least one liquid-repelling element 22 is configured to guide liquids to a predetermined location. The liquids can be aqueous, i.e., water-based, or non-aqueous, i.e., oil-based. By guiding the liquids to a predetermined location, the liquids can be wiped clean before they reach adjacent worktops or furniture. In some aspects, as shown in FIG. 4B, the panel 10 can also include a reservoir 30 that is engraved or etched into the panel 10. When present, the at least one liquid-repelling element 22 guides liquids to the reservoir 30, which holds the liquids and prevents them from flowing onto adjacent worktops or furniture. Although the reservoir 30 is only shown in FIG. 4B, it is understood that reservoirs 30 may be present in any of the exemplary configurations described above.

Figure 5:
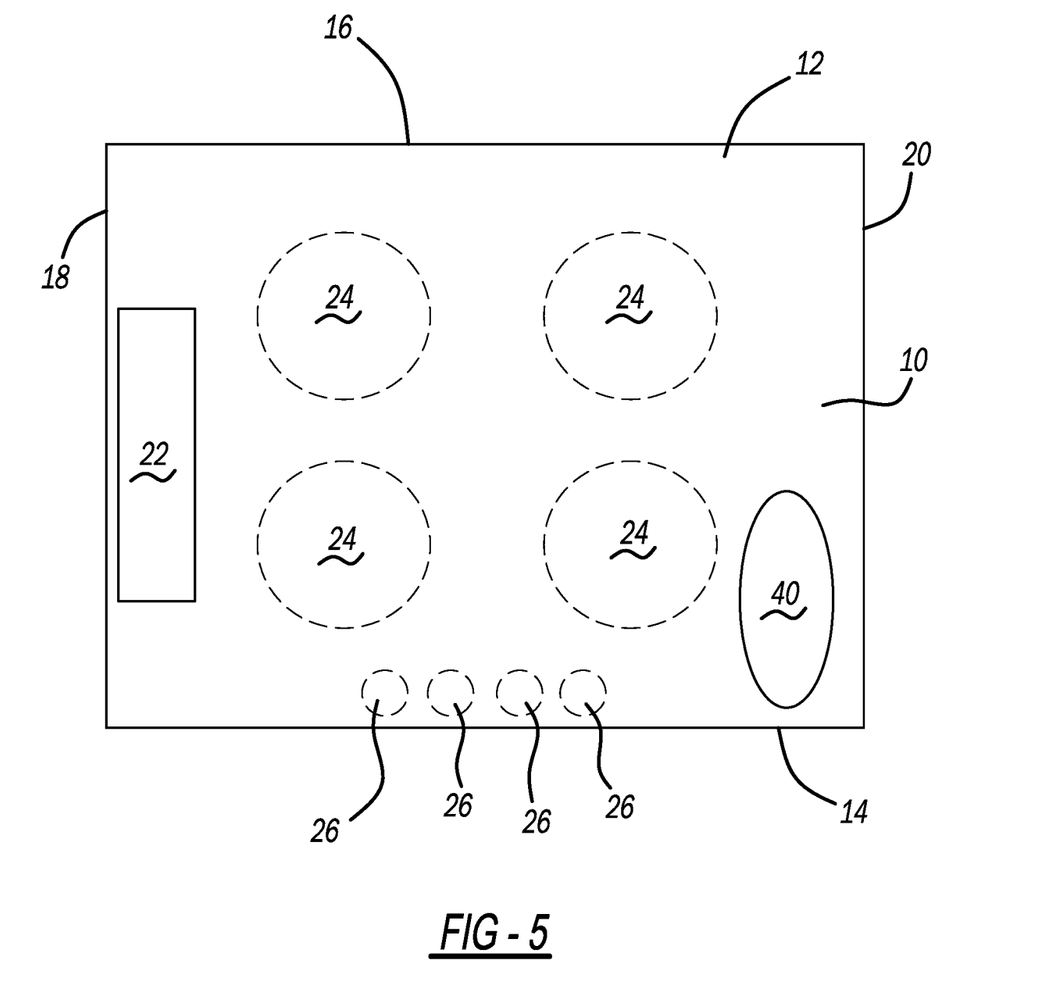
FIG. 5 is an illustration of the panel of FIG. 1 that additionally includes a utensil reservoir in accordance with various aspects of the current technology.

With reference to FIG. 5, the panel 10 in some aspects can also include a utensil reservoir 40 that is configured to accept a cooking utensil, such as a ladle, spoon, fork, spatula, or the like. The utensil reservoir 40 prevents or minimizes liquids from spilling from a cooking utensil and flowing onto the panel 10. Although the utensil reservoir 40 is depicted as an oval, the shape is not limiting. For example, the utensil reservoir 40 can also be in the shape of a circle, a polygon, or an irregular shape, such as an oval or spoon-shape. In some aspects, at least one liquid-repelling element 22 can be disposed about the utensil reservoir 40 to guide spills on the cooktop into the utensil reservoir 40, similar to the function of the reservoir 30 discussed in regard to FIG. 4B. As such, the utensil reservoir 40 can hold liquids originating from a cooking utensil and liquids originating from a spill on the panel 10.

As discussed above, the panel 10 can be incorporated into a cooking appliance, such as a cooktop, wherein the cooktop can be a gas cooktop, an electric cooktop, or an induction cooktop. Accordingly, the current technology also provides a cooking appliance comprising the panel 10.

The current technology further provides a method of preparing or fabricating a panel, such as the panel 10 described above. The method comprises disposing a precursor solution in a discontinuous pattern directly onto the surface of a blank glass ceramic panel. The precursor solution comprises zirconium (Zr), oxygen (O), and optionally silicon (Si). The zirconium (Zr) can be provided by zirconium alkoxide, a hydrolysate of zirconium alkoxide, a chelate compound of zirconium alkoxide, a chelate compound of a hydrolysate of zirconium alkoxide, zirconium oxide, and combinations thereof, as non-limiting examples. When present, the silicon (Si) can be provided by any compound that can form silicon oxide through a heat treatment. As non-limiting examples, the silicon (Si) can be provided by colloidal silica, silicon alkoxide, a hydrolysate of silicon alkoxide, and combinations thereof. The method then comprises performing a first heat treatment by heating the blank glass ceramic panel and the precursor solution to a temperature of greater than or equal to about 75° C. to less than or equal to about 900° C. for a time period of greater than or equal to about 5 minutes to less than or equal to about 24 hours and creating at least one liquid-repelling film on the surface having the discontinuous pattern from the precursor solution and forming the panel. The method optionally includes disposing a composition comprising phosphorus (P) over the at least one liquid-repelling film. As non-limiting examples, the composition comprising phosphorus (P) can be phosphoric acids, such as phosphoric acid, polyphosphoric acid, and metaphosphoric acid; phosphates, such as sodium phosphate and sodium hydrogen phosphate; condensed phosphates, such as sodium polyphosphate, sodium metaphosphate, sodium hydrogen polyphosphate, and sodium hydrogen metaphosphate; phosphoric acid compounds, such as phosphoric acid ester; and combinations thereof. By performing an optional second heat treatment by heating to a temperature of greater than or equal to about 75° C. to less than or equal to about 500° C. for a time period of greater than or equal to about 5 minutes to less than or equal to about 24 hours, the phosphorus (P) becomes incorporated into the at least one liquid-repelling film. When the second heat treatment is performed immediately after or shortly after disposing the composition comprising phosphorus (P) over the at least one liquid-repelling film, the method results in substantially distinct phosphorus (P) on the at least one liquid-repelling film. By allowing the composition comprising phosphorus (P) to partially absorb into the at least one liquid-repelling film prior to the second heat treatment, a phosphorus (P) concentration gradient, as discussed above, is formed after the second heat treatment is performed. By allowing the composition comprising phosphorus (P) to completely absorb into the at least one liquid-repelling film prior to the second heat treatment, the phosphorus (P) is uniformly dispersed throughout the at least one liquid-repelling film, as discussed above, after the second heat treatment is performed. The liquid-repelling films are non-hydrophobic, exhibit a water contact angle of less than or equal to about 90°, and direct aqueous liquids to at least one predetermined location on the panel. Examples of methods of forming the liquid-repelling film are described in U.S. Pat. No. 8,709,616, which is incorporated herein by reference in its entirety, as discussed above.

In some aspects, the method also comprises incorporating the panel into a cooking appliance.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A panel comprising:
   an exposed surface; and
   a plurality of liquid-repelling elements disposed directly on top of the exposed surface in a discontinuous pattern that does not define a complete enclosure,
   wherein each of the liquid-repelling elements includes a non-hydrophobic material that:
      comprises zirconium (Zr), oxygen (O), and at least one of silicon (Si) or phosphorus (P),
      is non-hydrophobic,
      exhibits a first water contact angle of less than or equal to about 90°, and directs aqueous liquids to at least one predetermined location.

2. The panel according to claim 1, wherein the panel comprises a glass ceramic material.

3. The panel according to claim 1, wherein the plurality of liquid-repelling elements has a different surface energy than the exposed surface.

4. The panel according to claim 1, wherein the plurality of liquid-repelling elements is visibly transparent.

5. The panel according to claim 1, wherein:
   the first water contact angle is greater than a second water contact angle exhibited by the exposed surface.

6. The panel according to claim 1, wherein the plurality of liquid-repelling elements exhibits a water contact angle greater than or equal to about 30° to less than or equal to about 70°.

7. The panel according to claim 1, wherein the non-hydrophobic material is a film comprising zirconium dioxide ($ZrO_2$) and silicon dioxide ($SiO_2$), the silicon dioxide ($SiO_2$) having a concentration of less than or equal to about 50 wt. % based on the total weight of the zirconium dioxide ($ZrO_2$) and the silicon dioxide ($SiO_2$).

8. The panel according to claim 7, wherein the film comprises greater than 0 wt. % to less than or equal to about 50 wt. % silicon dioxide ($SiO_2$) and further comprises phosphorus (P), the phosphorus (P) being dispersed either substantially uniformly throughout the film or in a concentration gradient that decreases from a top surface of the film to an opposing bottom surface of the film that is in direct contact with the exposed surface of the panel.

9. The panel according to claim 7, wherein:
   the film further comprises phosphorus (P), the phosphorus (P) being dispersed either substantially uniformly throughout the film or in a concentration gradient that decreases from a top surface of the film to an opposing bottom surface of the film that is in direct contact with the exposed surface of the panel.

10. The panel according to claim 1, wherein the discontinuous pattern comprises:
    discontinuous lines that extend about at least one edge of the panel;
    a plurality of segmented lines arranged in geometric patterns about at least one edge of the panel;
    at least one line defining a maze-type pattern that extends about at least one edge of the panel;
    a plurality of geometric elements disposed about a central region of the panel;
    a maze-type pattern disposed about a central region of the panel; or
    a combination thereof.

11. The panel according to claim 1, wherein the panel defines a cooktop surface.

12. The panel according to claim 1, wherein the plurality of liquid-repelling elements is substantially free of hydrophobic components.

13. A panel comprising:
    a substrate comprising a glass ceramic material and a top surface; and
    a plurality of liquid-repelling films disposed directly on top of the top surface in a discontinuous pattern that does not define a complete enclosure,
    wherein each of the plurality of liquid-repelling films:
       comprises zirconium (Zr), oxygen (O), and at least one of silicon (Si) or phosphorus (P),
       is non-hydrophobic,
       exhibits a water contact angle of less than or equal to about 90°, and
       directs aqueous liquids to at least one predetermined location.

14. The panel according to claim 13, further comprising at least one heating element region.

15. The panel according to claim 13, further comprising at least one reservoir configured to receive and hold an aqueous liquid directed to the reservoir by the liquid-repelling films.

16. A cooking appliance comprising the panel according to claim 13, wherein the panel defines a cooktop surface.

17. The cooking appliance according to claim 16, wherein the cooking appliance is a gas cooktop, an electric cooktop, or an induction cooktop.

* * * * *